(12) United States Patent
Font-Calafell et al.

(10) Patent No.: US 10,156,141 B2
(45) Date of Patent: Dec. 18, 2018

(54) ROTOR HEAT SHIELD AND METHOD FOR SECURING THE SAME INTO A ROTOR ASSEMBLY

(71) Applicant: Ansaldo Energia Switzerland AG, Baden (CH)

(72) Inventors: Edgar Font-Calafell, Zürich (CH); Carlos Simon-Delgado, Baden (CH); Fabian Neubrand, Rheinfelden (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 295 days.

(21) Appl. No.: 14/960,183

(22) Filed: Dec. 4, 2015

(65) Prior Publication Data

US 2016/0160649 A1 Jun. 9, 2016

(30) Foreign Application Priority Data

Dec. 8, 2014 (EP) .................................... 14196806

(51) Int. Cl.
*F01D 11/00* (2006.01)
*F01D 5/08* (2006.01)
*F02C 7/24* (2006.01)

(52) U.S. Cl.
CPC .............. *F01D 5/08* (2013.01); *F01D 11/001* (2013.01); *F01D 11/008* (2013.01); *F02C 7/24* (2013.01);
(Continued)

(58) Field of Classification Search
None
See application file for complete search history.

(56) References Cited

U.S. PATENT DOCUMENTS

| 5,611,669 | A | * | 3/1997 | Royle | F01D 5/323 |
|---|---|---|---|---|---|
| | | | | | 415/173.7 |
| 6,152,685 | A | * | 11/2000 | Hagi | F01D 11/10 |
| | | | | | 415/116 |

(Continued)

FOREIGN PATENT DOCUMENTS

| EP | 1 264 964 | 12/2002 |
|---|---|---|
| GB | 2 280 478 A | 2/1995 |
| GB | 2 293 628 A | 4/1996 |

OTHER PUBLICATIONS

The Extended European Search Report dated May 29, 2015, issued in corresponding European Patent Application No. 14196806.5-1610. (7 pages).

*Primary Examiner* — David E Sosnowski
*Assistant Examiner* — Theodore Ribadeneyra
(74) *Attorney, Agent, or Firm* — Buchanan Ingersoll & Rooney PC

(57) ABSTRACT

The present disclosure generally relates to a rotor assembly, and in particular relates to an improved rotor heat shield which provides an innovative configuration for securing the same to the rotor assembly. The rotor heat shield element is secured to the rotor assembly in correspondence of the groove in which it is inserted. Embodiments of the present disclosure can allow the removal of current fixation features on heat shields and blades. Furthermore, since the heat shield is no longer connected to a blade but directly to the rotor assembly, there is more freedom in selecting the number of heat shield elements to be provided to form the circumferential heat shield.

11 Claims, 10 Drawing Sheets

(52) U.S. Cl.
CPC ...... *F05D 2220/32* (2013.01); *F05D 2230/60* (2013.01); *F05D 2240/24* (2013.01); *F05D 2260/231* (2013.01); *F05D 2260/30* (2013.01)

(56) References Cited

U.S. PATENT DOCUMENTS

| | | | |
|---|---|---|---|
| 6,217,279 B1* | 4/2001 | Ai | F01D 9/065 |
| | | | 415/110 |
| 2002/0187046 A1 | 12/2002 | Beutin et al. | |
| 2008/0181767 A1* | 7/2008 | Brillert | F01D 5/081 |
| | | | 415/170.1 |
| 2008/0181778 A1* | 7/2008 | Staempfli | F01D 5/08 |
| | | | 416/204 R |
| 2010/0074731 A1* | 3/2010 | Wiebe | F01D 11/001 |
| | | | 415/173.4 |
| 2010/0074732 A1* | 3/2010 | Marra | F01D 5/025 |
| | | | 415/173.4 |
| 2013/0156588 A1* | 6/2013 | Murdock | F01D 5/147 |
| | | | 416/220 R |
| 2014/0069109 A1* | 3/2014 | Murdock | F01D 5/28 |
| | | | 60/805 |

* cited by examiner

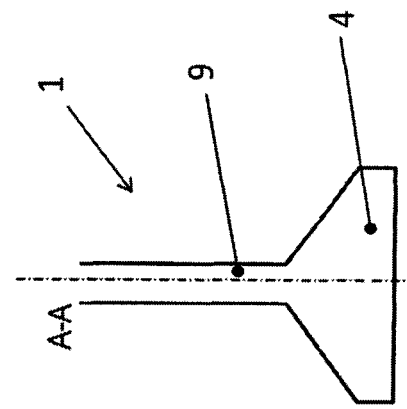
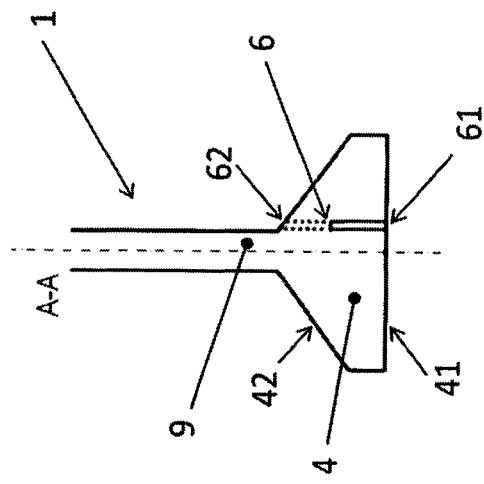
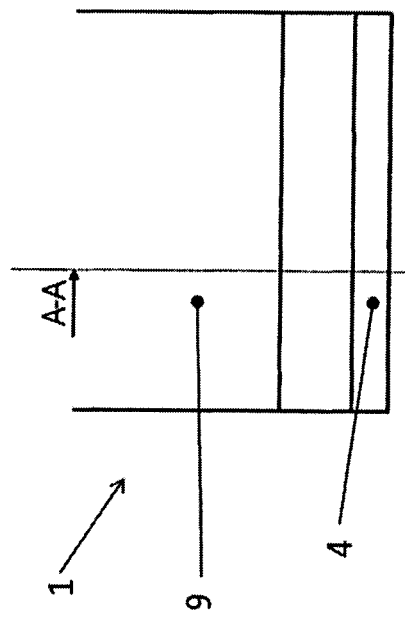
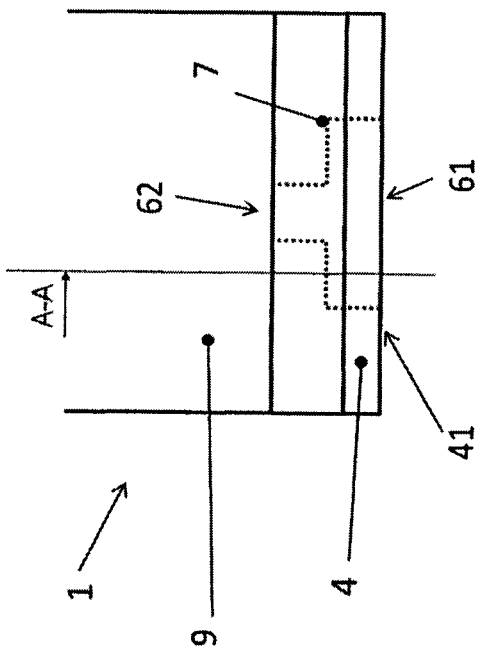

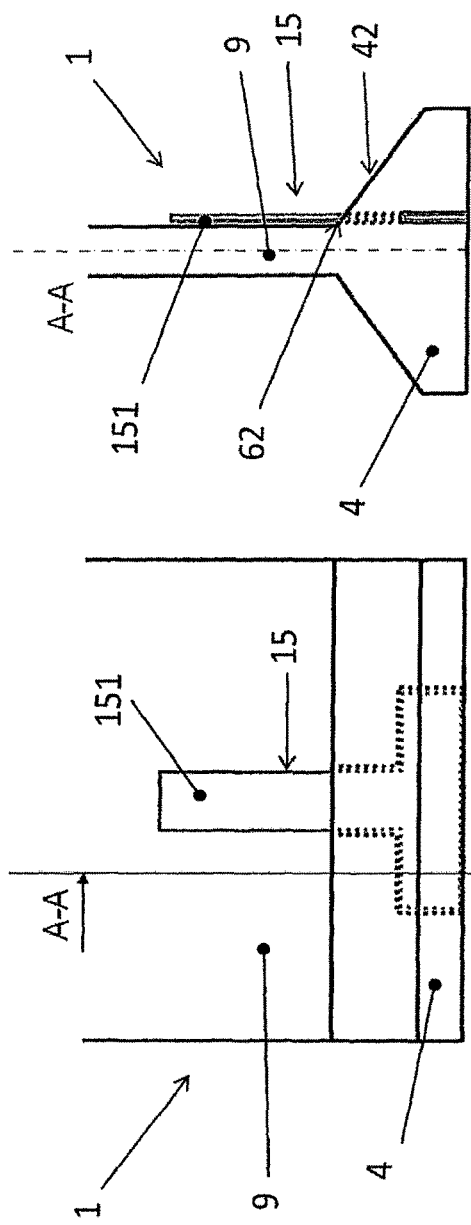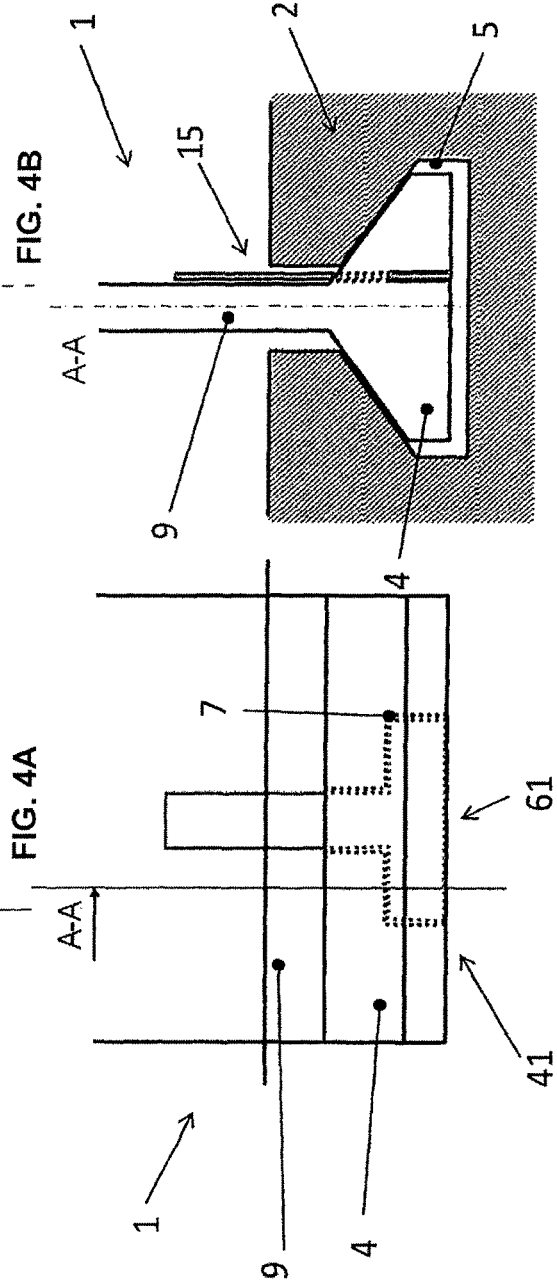

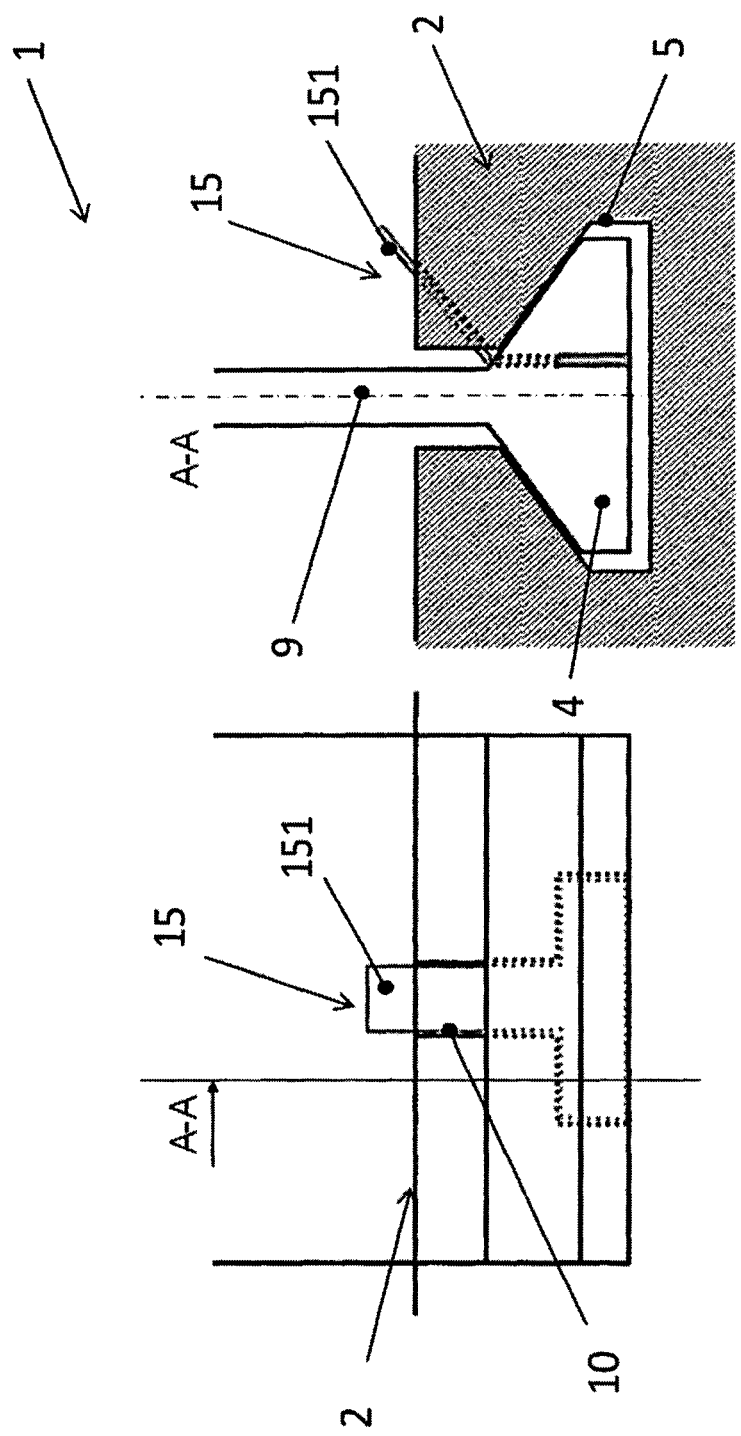

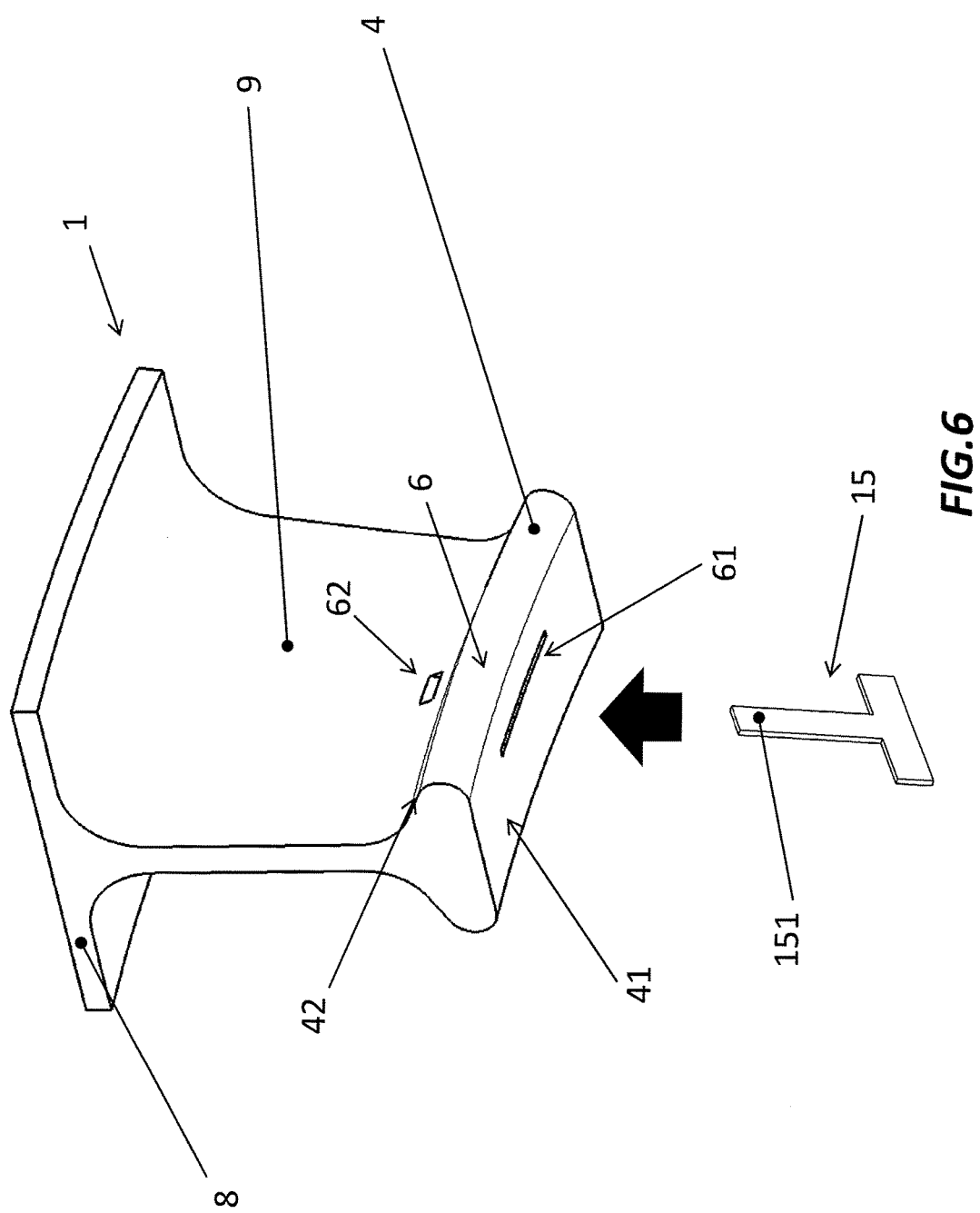

ROTOR HEAT SHIELD AND METHOD FOR SECURING THE SAME INTO A ROTOR ASSEMBLY

FIELD OF THE INVENTION

The present invention generally relates to a rotor assembly, and in particular relates to an improved rotor heat shield element which provides an innovative configuration for securing the same into the rotor assembly.

BACKGROUND

As well known, in conventional gas turbines, rotating machines typically have a rotor which has several rotor blade rows with a plurality of rotor blades, and generally also at least one rotor heat shield composed by a plurality of heat shield elements, wherein the rotor heat shield is arranged axially between two adjacent rotor blade rows.

According to current practise, the heat shield elements are inserted sequentially into a correspondent groove engraved into the rotor assembly, such to form a circumferential heat shield. In particular, each heat shield element is circumferentially fixed by means of a lug disposed on a neighbouring blade, which is accommodated in a receiving slot formed on the heat shield element. This connection is established at outer diameters (where large circumferential forces are involved), close to hot gas path (typically hotter metal temperature). Therefore, in the consideration that each rotor shield element is connected to a correspondent blade, the number of shield elements has to be somehow dependent on the number of the blades, that is the shield elements are in the same number, or half, or a third and so on.

However, current design presents a number of drawbacks. In fact, the presence of connecting lugs on the blades and corresponding receiving slots on heat shield elements determine a rather complex design to be carried out for both components. Furthermore, the lugs entail an undesirable weight increase of the blades.

Moreover, as the fixation is done at outer diameters of the machine, significant loads are transferred at the contact surfaces.

The present invention addresses these technical problems.

SUMMARY OF THE INVENTION

It is an object of the present invention to solve the aforementioned technical problems with reference to the state of the art by providing a rotor heat shield element.

It is a further object of the present invention to provide a rotor assembly.

It is a further object of the present invention to provide a method for inserting and securing a rotor heat shield element into a rotor assembly.

Preferred embodiments are defined in correspondent dependent claims.

As it will appear clear from the detailed description of some exemplary, and not limiting, preferred embodiments of the invention, the rotor heat shield element is secured to the rotor assembly in correspondence of the groove in which it is inserted. In particular, as it will be detailed below, such connection is preferably achieved by means of a fixing plate, which does not interfere with the current assembly process of the rotor heat shield element.

Also, the present invention allows the removal of current fixation features on heat shields and blades, that is lugs and correspondent receiving slots respectively.

Furthermore, since the heat shield is no longer connected to a blade but directly to the rotor assembly, there is more freedom in selecting the number of heat shield elements to be provided to form the circumferential heat shield.

Moreover, it will be appreciated that, as the fixation is established in correspondence to the groove of the rotor shaft, circumferential forces transmitted at the contact surfaces are significantly reduced respect the prior art arrangement. In other words, anti-rotation stresses are transferred to a lower radius of the machine, and thus are reduced.

According to an aspect of the present invention, it is provided a rotor heat shield element for a rotor assembly of a gas turbine, comprising a heat shield, a base feet adapted to be inserted into a correspondent groove in the rotor assembly, the base feet being connected to the heat shield through a connection plate, the rotor heat shield element comprising securing means adapted to secure the rotor heat shield element to the rotor assembly, wherein the securing means are configured to cooperate with the rotor assembly in correspondence of the groove for establishing such connection.

According to a preferred aspect of the invention, the securing means comprises a through-opening internally defined in said base feet, the through-opening having an inlet located on a bottom wall of the base feet and an outlet on an opposed wall thereto, wherein the through-opening is internally shaped such to define at least one stepped region.

According to a further preferred aspect of the present invention, the through-opening is disposed along a radial direction of the rotor assembly when the base feet is inserted in the groove.

According to different preferred embodiments, the through-opening may be T-shaped, L-shaped or alternatively U-shaped. It will be appreciated that other shapes may also be considered.

According to a further aspect of the invention the outlet may be located in the proximity the connection plate. Alternatively, the outlet is located in the proximity of a free end of the base feet.

According to another aspect of the invention, it is provided a rotor assembly for a gas turbine, the rotor assembly comprising a circumferential groove for receiving a plurality of base feet, wherein it further comprises rotor connection means configured to connect the base feet to the rotor assembly, the rotor connection means being located in correspondence of the groove.

According to a preferred aspect of the invention, the rotor connection means comprises at least a recess located on a lateral wall of the groove.

According to a further preferred aspect of the invention, the rotor assembly further comprises a plurality of recesses equidistantly located on the lateral wall of the groove.

It is also provided a method for inserting and securing a rotor heat shield element into a rotor assembly, the method including the steps of providing a rotor heat shield element comprising a base feet, wherein the base feet defines internally a through-opening having an inlet located on a bottom wall and an outlet on an opposed wall thereto of the base feet, the through-opening being internally shaped such to define at least one stepped region; inserting into the through-opening a fixing plate, the fixing plate having a shape adapted to substantially match the internal shape of said through-opening and comprising a blocking portion extending out from said outlet of the opposed wall when inserted into the base feet; introducing the rotor heat shield into a rotor assembly, the rotor assembly comprising a circumferential groove shaped such to receive said base feet, said groove further comprising at least a recess located on a lateral wall of the groove; positioning the rotor heat shield element in the groove such that the blocking portion of the fixing plate is substantially aligned with the recess; bending the blocking portion towards the recess such to prevent circumferential movement of the rotor heat shield element along the groove.

BRIEF DESCRIPTION OF DRAWINGS

The foregoing objects and many of the attendant advantages of this invention will become more readily appreciated as the same becomes better understood by reference to the following detailed description when taken in conjunction with the accompanying drawings, wherein:

FIGS. 3A-3D show a schematic radial section of a heat shield element and the steps of the method in sequence for securing the heat shield element to the rotor assembly;

FIGS. 4A-4D show a schematic radial section of a heat shield element and the steps of the method in sequence for securing the heat shield element to the rotor assembly;

FIGS. 5A-5B show a schematic radial section of a heat shield element and the steps of the method in sequence for securing the heat shield element to the rotor assembly;

FIGS. 6-9 show the sequence of securing the heat shield element to the rotor assembly according to the present invention in perspective views;

DETAILED DESCRIPTION OF THE DRAWINGS

Figure 1:
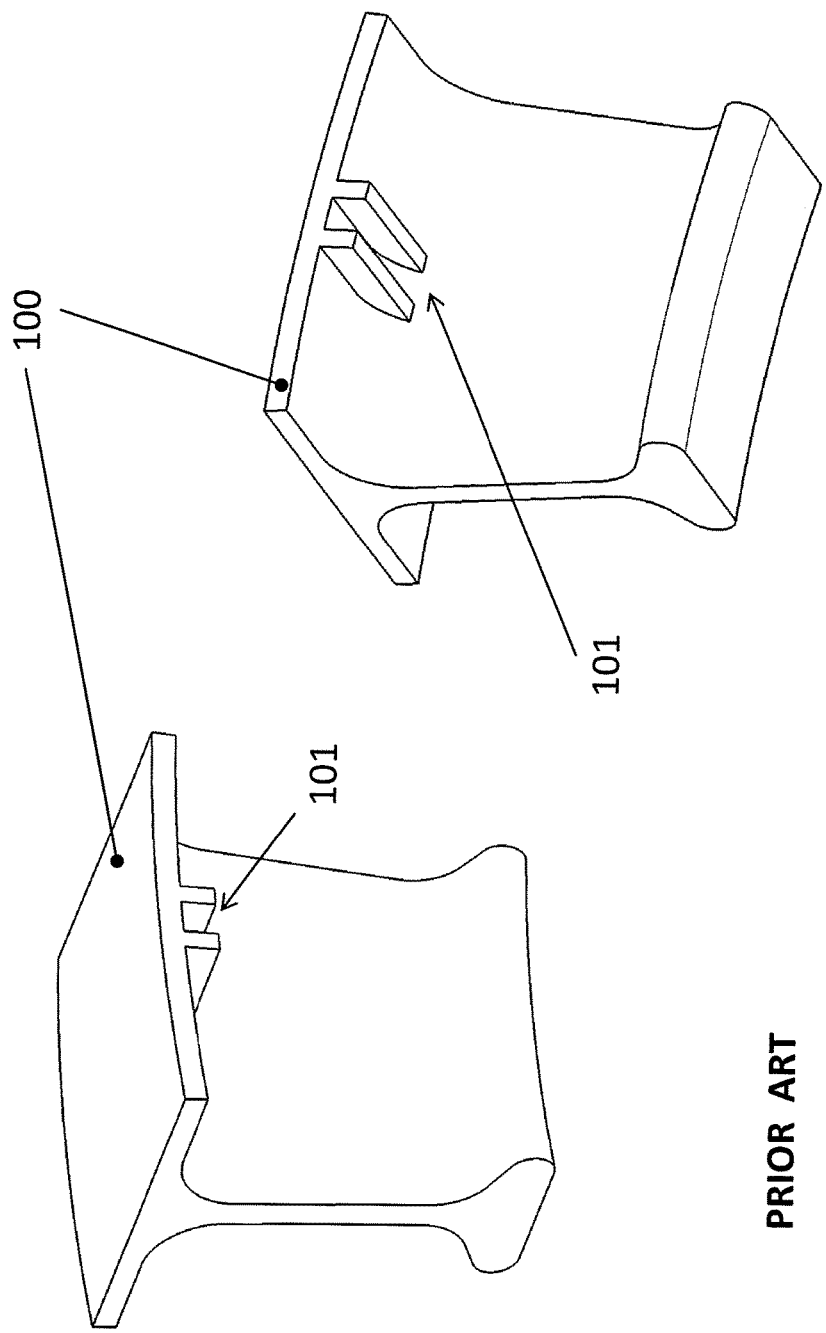
FIG. 1 shows a perspective view of a rotor heat shield element according to the prior art.

With reference to FIG. 1, it is showed a rotor heat shield element 100 according to the prior art. In particular, the heat shield element 100 comprises connection means 101, in the form of receiving guides, which are adapted to host a lug provided on a correspondent blade, to which the heat shield element is secured.

Figure 2:
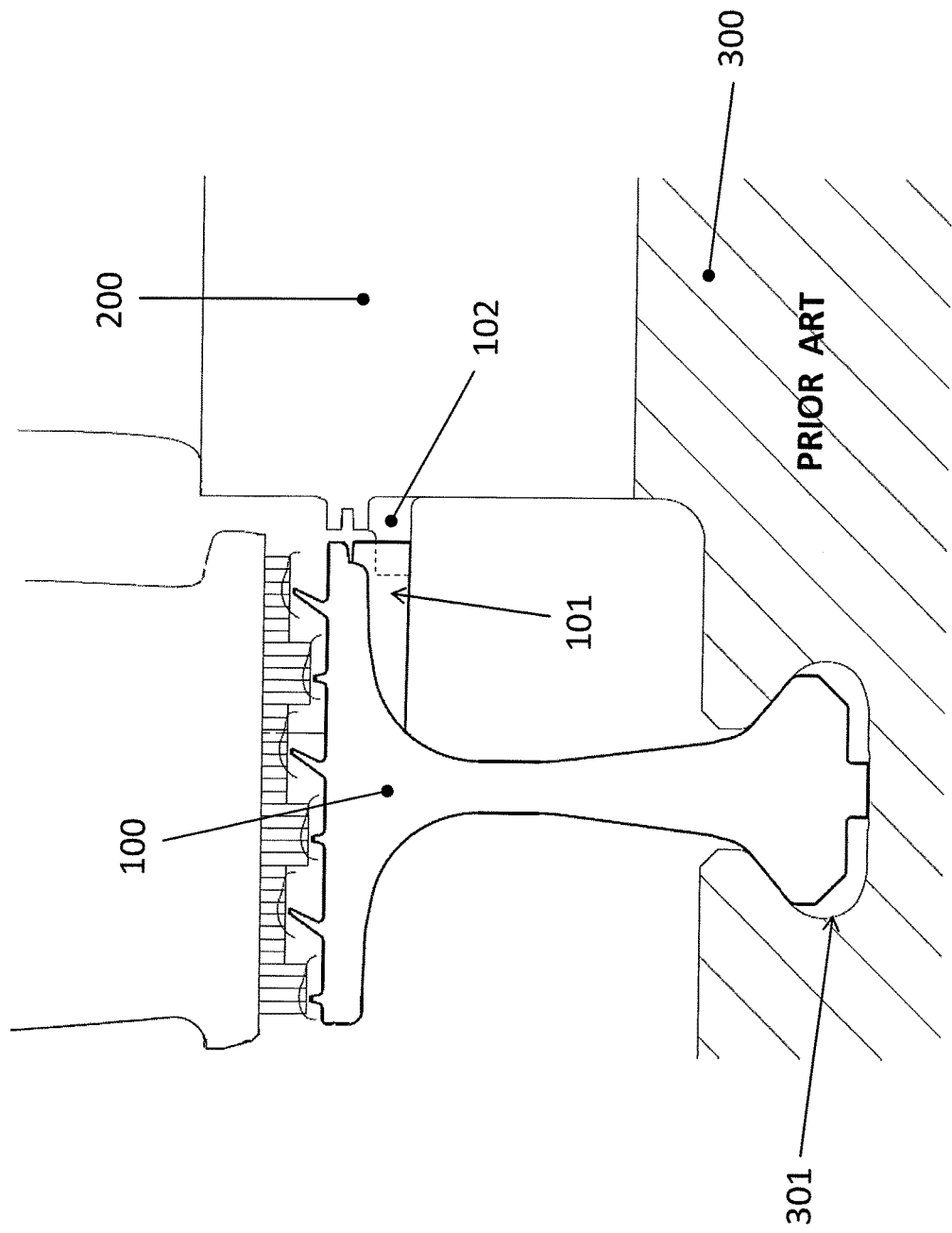
FIG. 2 shows a radial section of an engagement between a rotor heat shield and a correspondent blade according to the prior art.

This kind of connection, pertaining to the current practise, is schematically illustrated in next FIG. 2. As shown, the rotor heat shield 100 is connected to a correspondent blade 200 by means of a lug 102 which is inserted into the receiving guide 101 of the shield element 100. The shield element is inserted into a circumferential groove 301 of the rotor assembly 300, and it is connected to the blade 200 which in turn is secured to the rotor assembly 300.

With reference to FIGS. 3A-3D, it is shown a radial section of the heat shield element 1 according to the present invention, in a front view (left) and a lateral view (right). The heat shield element comprises a base feet 4, adapted to be inserted into a correspondent groove of a rotor assembly (not shown), and a connection plate 9 which links the base feet 4 to a heat shield (not depicted in the figures). With reference to the FIGS. 3C and 3D, the heat shield element 1 further comprises securing means 6 adapted to secure the heat shield element to the rotor assembly. In particular, as it will be explained below in detail, the securing means 6 is advantageously configured to secure the heat shield element to the rotor assembly by cooperating with the groove in which the base feet 4 is inserted.

In the preferred embodiment shown here as a non-limiting example, the securing means 6 comprises a through-opening 6 which is internally defined in the base feet 4. The through-opening 6 has an inlet 61 located on a bottom wall 41 of the base feet 4 and an outlet 62 located on a wall 42 which is opposed to the bottom wall 41. In particular, the through-opening 6 is internally shaped such to define a stepped region 7. The through-opening 6 shown here in this example is T-shaped, having two stepped regions, but it will be appreciated that other shapes can be chosen, as long as they provide a stepped region. A u-shape may be selected, still providing two stepped regions, or alternatively an L-shaped may be considered, the latter providing only one stepped region.

The through-opening 6 may be obtained, starting from the rotor heat shield element 1 depicted on top view, with methodologies known to those who are skilled in the art, like for example through a machining process.

With reference to FIGS. 4A-4D, there are shown the next steps necessary for securing the heat shield element 1 to a rotor assembly, now schematically depicted with numeral reference 2. A fixing plate 15 is then inserted into the through-opening 6. As clearly visible in the figures, the fixing plate 15 has a shape which substantially matches the internal shape of the through-opening 6. As it will be appreciated, the fixing plate 15 is subjected, during rotation of the rotor assembly, to an important centrifugal load. Thus, the stepped region 7 provided along the internal shape of the through-opening 6 is necessary to keep the fixing plate in position during operation of the machine. The fixing plate 15, in this non-limiting example, is T-shaped. The fixing plate 15 comprises a blocking portion 151 which extends out from the base feet 4, in particular from the outlet 62 of the wall 42. Preferably, the through-opening 6 is disposed within the base feet 4 along a radial direction of the rotor assembly, when the heat shield element is inserted into the correspondent groove. Such configuration is optimal for achieving an efficient and stable connection with the rotor assembly, as it will be clear in the following. According to a further preferred aspect, the outlet 62 is located in the proximity of the connection plate 9, so that the fixing plate 15, and in particular the blocking element 151 lies adjacent to the connection plate 9. Alternatively, the outlet may be located anywhere along the opposed wall, and for example in the proximity of a free end of the base feet 4 (embodiment not shown). In this case, the blocking portion 151 is firstly bent along the wall 42 and then is straightened back following the vertical direction of the connection plate 9.

Still making reference to FIGS. 4A and 4D, the heat shield element 1, including the fixing plate 15, is introduced into the rotor assembly 2. The rotor assembly 2 comprises a circumferential groove 5 adapted such to receive the base feet 4.

With now reference to next FIGS. 5A-5B, the groove 5 of the rotor assembly 2, advantageously, comprises rotor connection means 10 which is configured to connect the base feet 4, and thus the rotor heat shield element 1, to the rotor assembly 2. In particular, the rotor connection means 10 is located in correspondence of the groove 5. In the preferred embodiment herewith described, the rotor connection means 10 comprises a recess 10, which is located on a lateral wall of the groove 5. The rotor heat shield element 1 is then positioned within the groove 5 such that the blocking portion 151 is substantially aligned with the recess 10. As a final step, the blocking portion 151 is bent towards the recess 10 to establish a solid connection between the rotor heat shield element 1 and the rotor assembly 2.

It will be understood that the circumferential groove 5 of the rotor assembly 2 may comprises a plurality of recesses 10, equidistantly spaced along the lateral wall of the groove 5. The number of the recesses 10 engraved into the groove 5 may match the number of rotor heat shield elements 1 sequentially inserted into the groove 5, to finally form the complete circumferential heat shield. It will be appreciated that during such operation, each rotor heat shield element 1 is inserted into the groove 5 and positioned substantially in correspondence to the respective recess 10, in order to obtain the connection as above detailed.

The steps according to the method for inserting and securing the rotor heat shield element into the rotor assembly can be even better appreciated with reference to next FIGS. 6-10, where the components object to the present invention, that is the rotor heat shield and the rotor assembly, are shown in perspective views.

Figure 7:
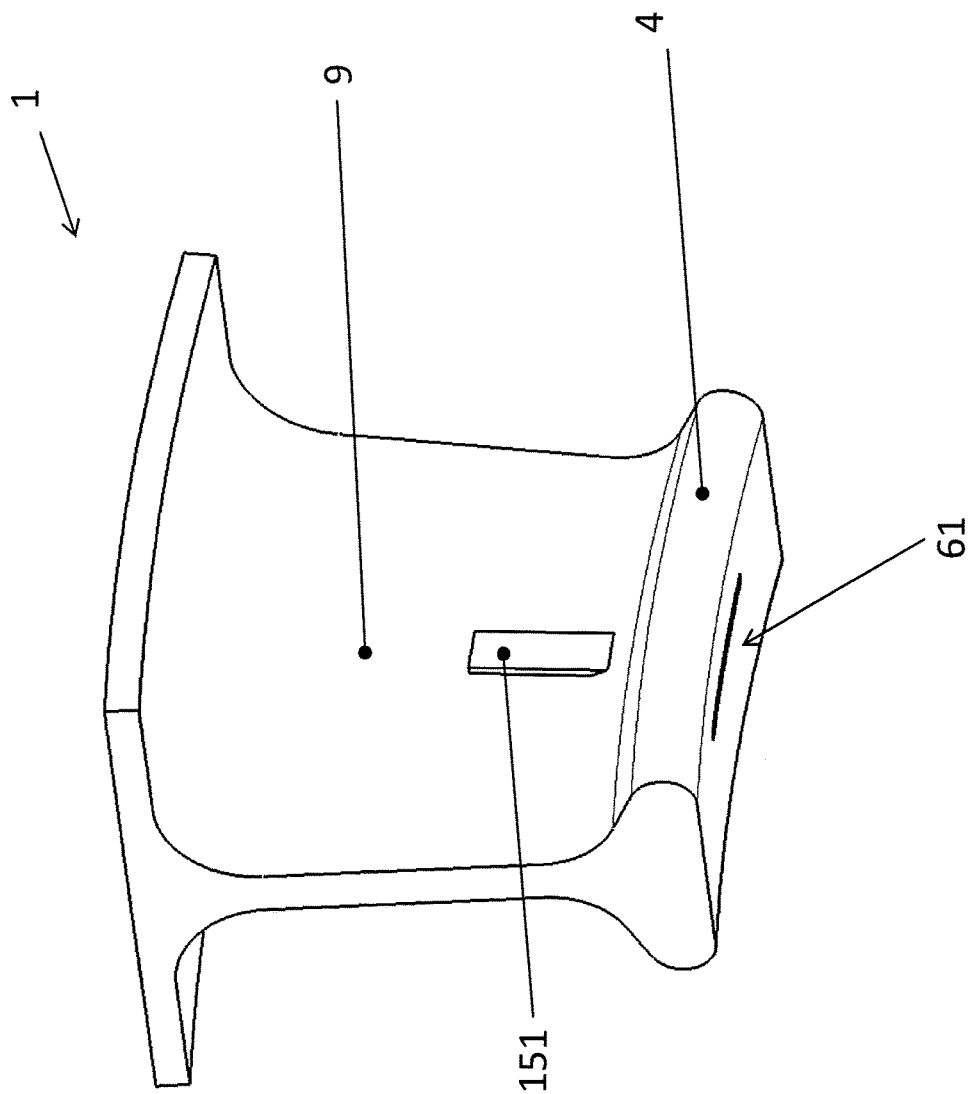

With reference to FIG. 6, the complete rotor heat shield element 1 is pictured, now showing also a heat shield 8, which is connected to the base feet 4 through the connection plate 9. The base feet comprises securing means 6, that is the through-opening 6 which, in this example, is T-shaped and defines internally two stepped regions. The fixing plate 15 is then inserted into the through-opening 6, such that the blocking portion 151 extends out from the base feet 4 and it is disposed adjacent to the connection plate 9, as shown in FIG. 7.

Figure 8:
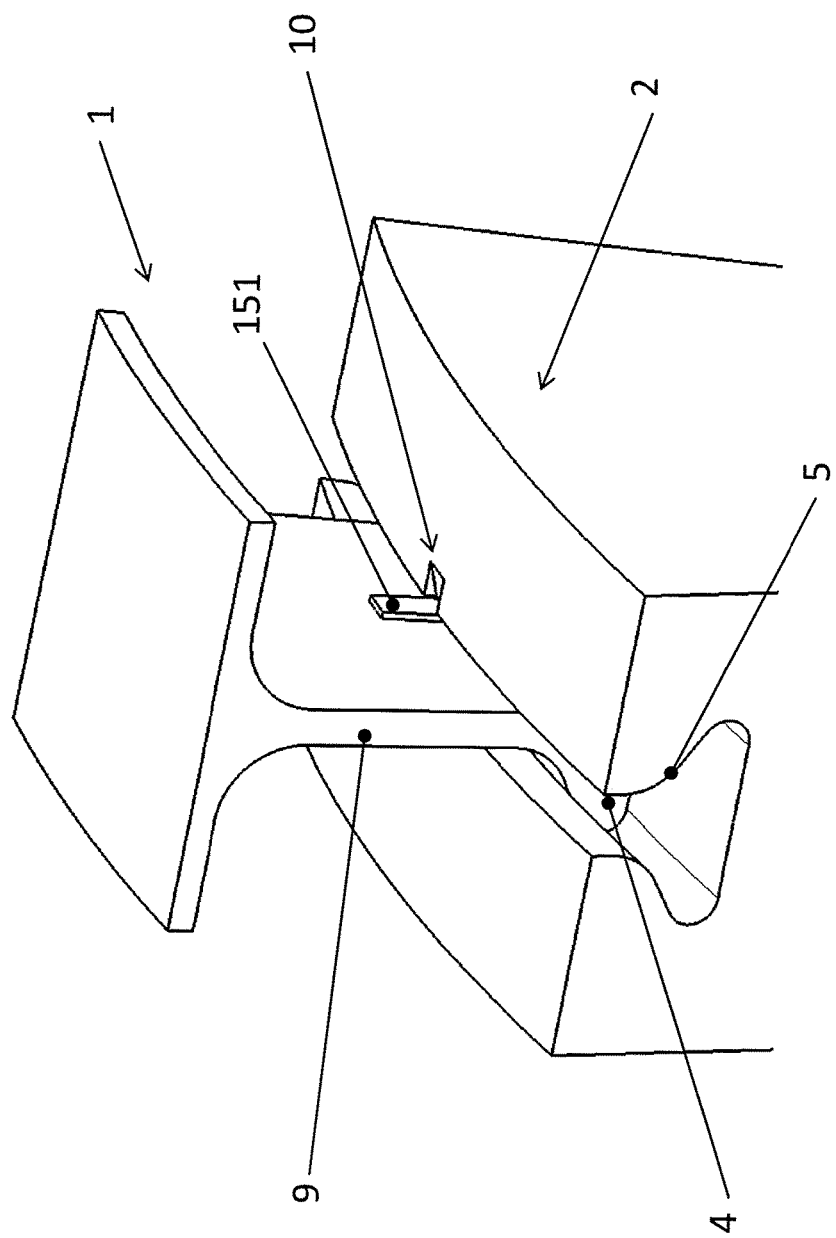

After the insertion of the fixing plate 15, the heat shield element 1 is introduced into the correspondent groove 5 of the rotor assembly 2, as shown in FIG. 8. In particular, the element 1 is introduced such that the blocking element 151 is substantially aligned with the recess 10 engraved on the lateral wall of the groove 5.

Figure 9:
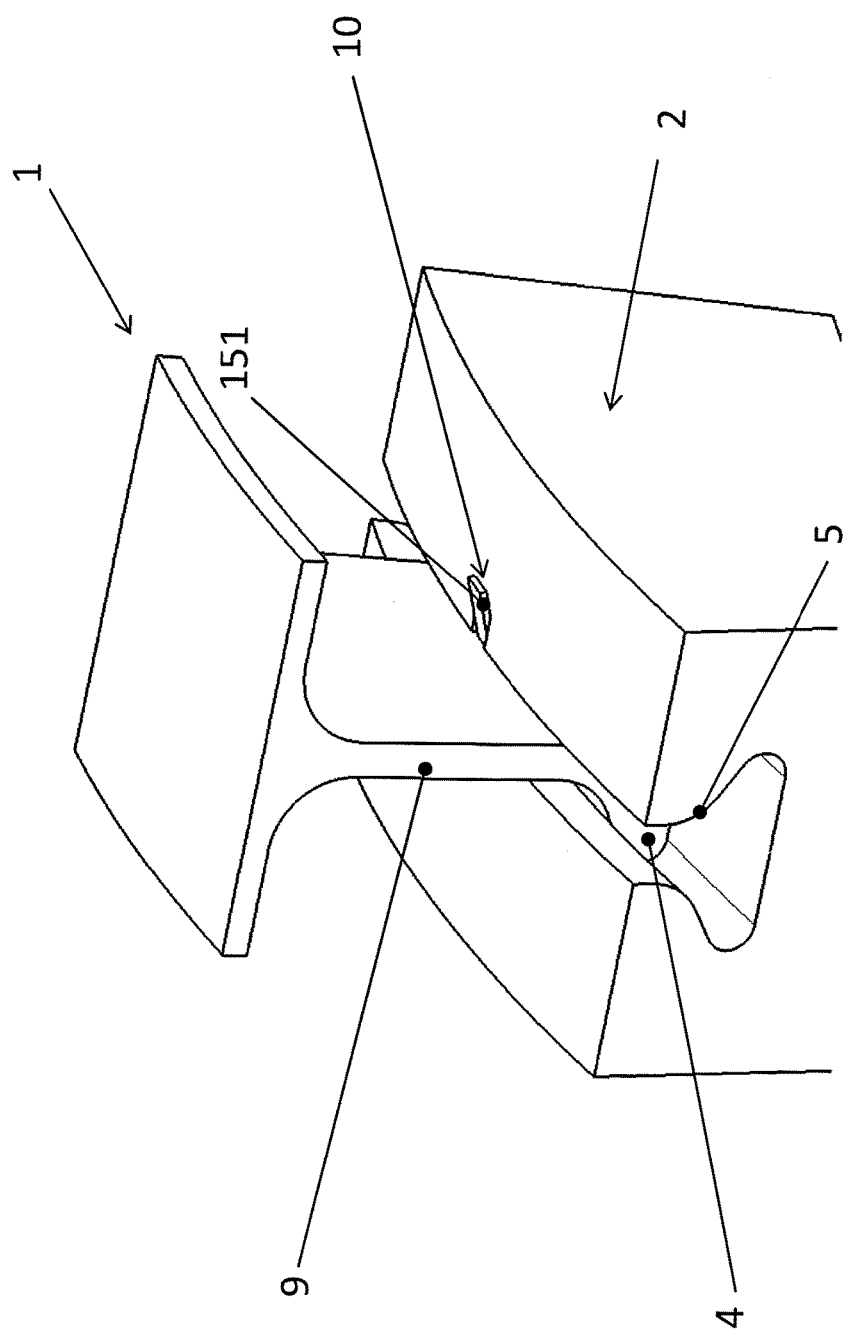

FIG. 9 shows the final stage of the process when the blocking portion 151 is bent towards the recess 10. This way, circumferential movement of the rotor heat shield element 1 is prevented from the cooperation of the blocking portion 151 acting on the recess 10, whilst radial and axial movements of the element 1 are prevented by the cooperation of the base feet 4 inserted into the groove 5. This way stability of rotor heat shield element 1 is ensured.

Figure 10A:
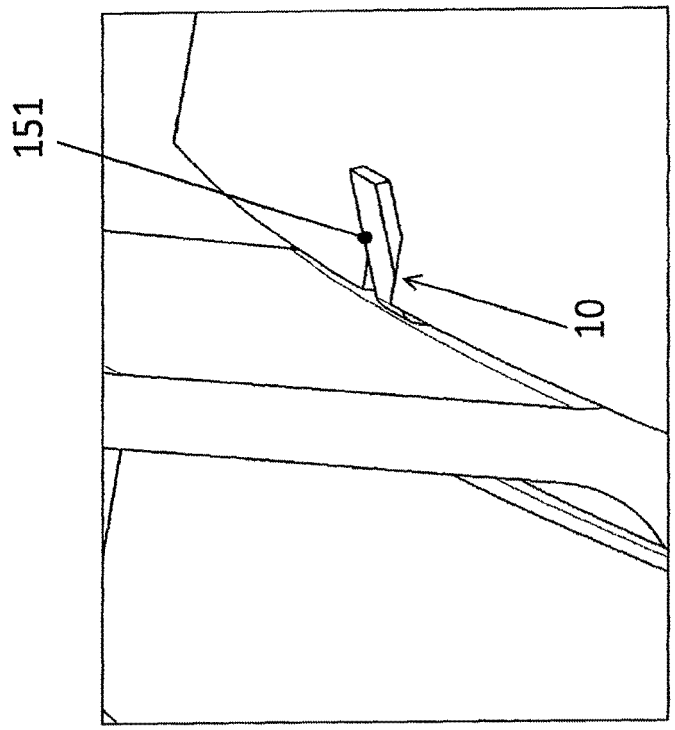
FIGS. 10A-10B show the sequence of securing the heat shield element to the rotor assembly according to the present invention in perspective views.
Figure 10B:
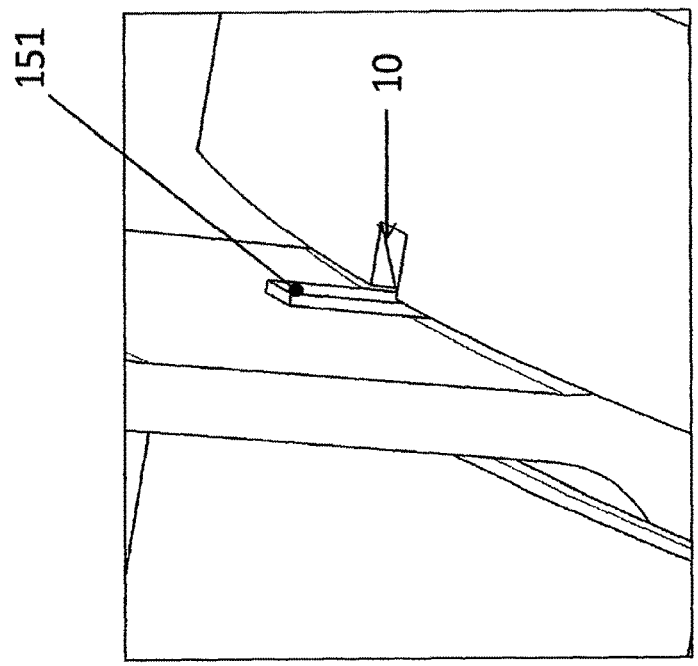

Last FIGS. 10A-10B show in more detail the step of bending the blocking portion 151 into the recess 10. Preferably, the fixing plate is made of metal. Indeed, such material is malleable and therefore can be deformed permanently without breaking or cracking.

It will also be appreciated that the arrangement described above may be applied, mutatis mutandis, to any component which is installed radially by sliding components on a radial groove and that at the end of the assembly procedure further rotation of the components inside the groove needs to be completely avoided, so radially fixed, such as stator vanes or heat shields.

Lastly, it will be appreciated that other variants including changes in positioning and geometry of the fixing plate 15, through-opening 6 and rotor recess 10 may involve additional bending operations of the fixing plate against the base feet 4 and/or the connection plate 9. Such operations will occur after mounting the fixing plate 15 into the through-opening groove 6 and before mounting the rotor heat shield element 1 into the rotor assembly 2 in order to allow the rotor heat shield element 1 to slip along the circumferential groove 5 without the fixing plate 15 interfering. A second bending operation shall secure the fixing plate 15 into the rotor recess 10.

Although the present invention has been fully described in connection with preferred embodiments, it is evident that modifications may be introduced within the scope thereof, not considering the application to be limited by these embodiments, but by the content of the following claims.

The invention claimed is:

1. Rotor heat shield element for a rotor assembly of a gas turbine, comprising: a heat shield, base feet configured to be inserted into a correspondent groove in a rotor assembly, the base feet being connected to the heat shield through a connection plate, the rotor heat shield element including a through-opening internally defined in said base feet, the through-opening having an inlet located on a bottom wall and an outlet on an opposed wall thereto of the base feet, wherein said through-opening is internally shaped such to define at least one stepped region wherein the inlet is larger than the outlet and is configured to receive a fixing plate for securing the rotor heat shield element to the rotor assembly.

2. Rotor heat shield element according to claim 1, wherein said through-opening is disposed along a radial direction of the rotor when the base feet are inserted in the groove of the rotor.

3. Rotor heat shield element according to claim 1, wherein said through-opening is T-shaped.

4. Rotor heat shield element according to claim 1, wherein said through-opening is L-shaped.

5. Rotor heat shield element according to claim 1, wherein said through-opening is U-shaped.

6. Rotor heat shield element according to claim 1, wherein said outlet is located in a proximity of said connection plate.

7. Rotor heat shield element according to claim 1, wherein said outlet is located centred or in a proximity of a free end of said base feet.

8. Rotor assembly for a gas turbine, said rotor assembly comprising:
    an outer surface;
    a circumferential groove in the outer surface for receiving a plurality of base feet; and
    at least a recess located in a lateral wall of said groove and in the outer surface, the recess having facing sidewalls and a bottom wall sloped relative to the outer surface and the lateral wall.

9. Rotor assembly for a gas turbine according to claim 8, comprising:
    a plurality of recesses equidistantly located on a lateral wall of said groove.

10. Method for inserting and securing a rotor heat shield element into a rotor assembly, the method comprising:
    providing a rotor heat shield element having base feet, wherein said base feet define internally a through-opening having an inlet located on a bottom wall and an outlet on an opposed wall thereto of the base feet, the through-opening being internally shaped such to define at least one stepped region;
    inserting into the through-opening a fixing plate, the fixing plate having a shape to substantially match the internal shape of said through-opening and containing a blocking portion extending out from said outlet of the opposed wall when inserted into the base feet;
    introducing the rotor heat shield into a rotor assembly, the rotor assembly including a circumferential groove shaped to receive said base feet, said groove containing at least a recess located on a lateral wall of said groove;
    positioning the rotor heat shield element in the groove such that the blocking portion of the fixing plate is substantially aligned with said recess; and
    bending the blocking portion towards the recess such to prevent movement of the rotor heat shield element along said groove.

11. The method according to claim 1, wherein said groove includes a plurality of recesses equidistantly located on said lateral wall, the method comprising:

introducing a plurality of rotor heat shields into said groove, each rotor heat shield being positioned substantially in correspondence to a respective recess.

\* \* \* \* \*